2 Sheets—Sheet 1.

J. C. BAKER.
SEEDING-MACHINE.

No. 189,679. Patented April 17, 1877.

Witnesses:

Inventor.
J. C. Baker,
by Dodge & Son
Attys.

N. PETERS, PHOTO-LITHOGRAPHER, WASHINGTON, D. C.

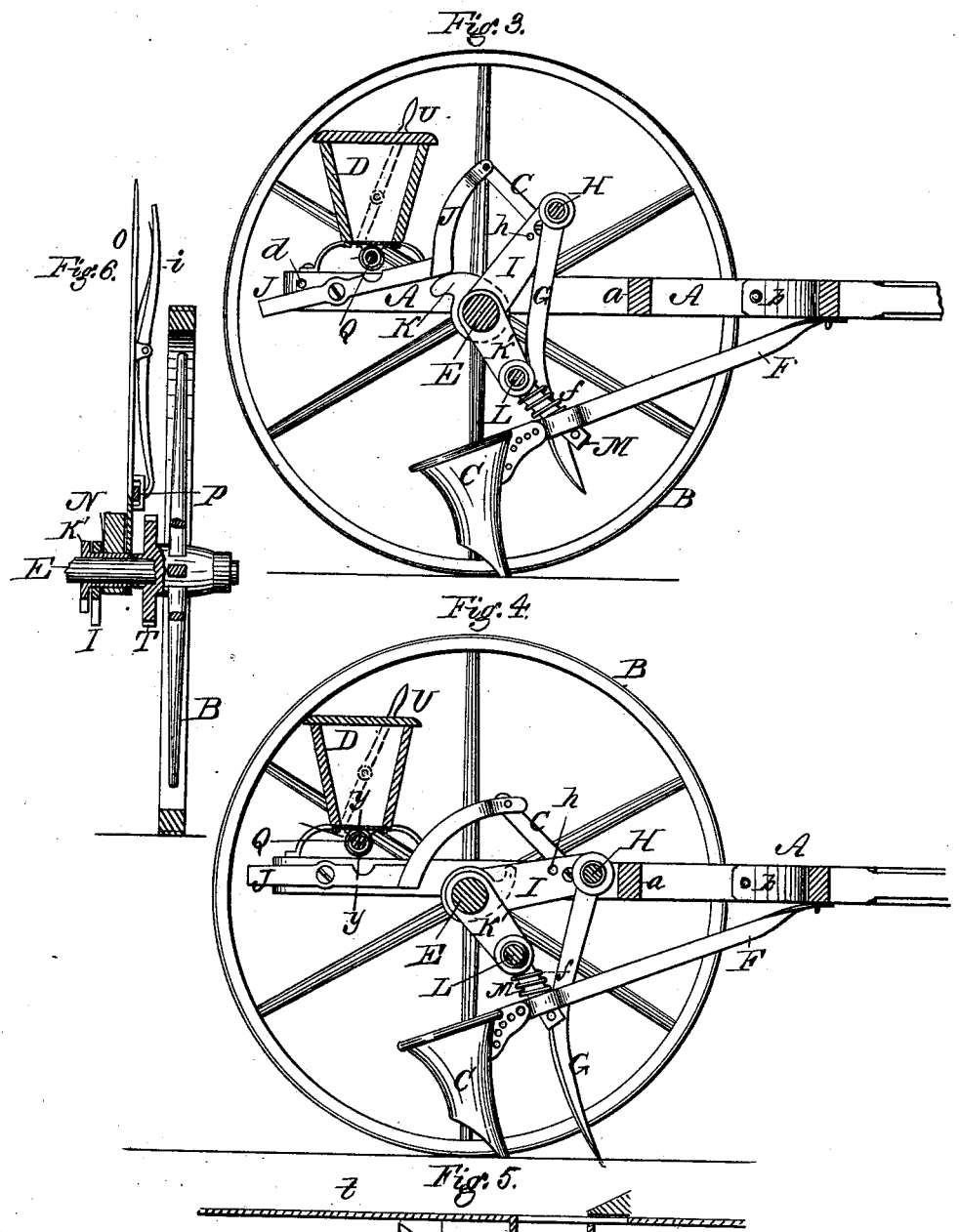
J. C. BAKER.
SEEDING-MACHINE.
No. 189,679. Patented April 17, 1877.
2 Sheets—Sheet 2

UNITED STATES PATENT OFFICE.

JOHN C. BAKER, OF MECHANICSBURG, OHIO.

IMPROVEMENT IN SEEDING-MACHINES.

Specification forming part of Letters Patent No. 189,679, dated April 17, 1877; application filed April 5, 1875.

*To all whom it may concern:*

Be it known that I, JOHN C. BAKER, of Mechanicsburg, in the county of Champaign and State of Ohio, have invented certain Improvements in Seeding-Machines, of which the following is a specification:

My invention relates to that class of machines in which a series of drag-bars or beams are hinged at their forward ends, in a straight row, to the front of a wheeled frame; and it consists in forming said frame of a single bar of wood, bent into such shape as to form the side bars and a straight cross-bar in front, the front bar being adapted to carry the ends of the series of drag-bars in a straight row or line, as required in the use of pendant clearer arms attached to a pivoted frame, and raised at suitable intervals by a cam for the purpose of preventing the accumulation of weeds and rubbish in front of the hoes; in a novel arrangement of the lever for controlling the rate of feed; and in a novel combination of the lever, by which the hoes are raised and lowered with the mechanism for throwing the feeding devices into and out of gear.

Figure 1:
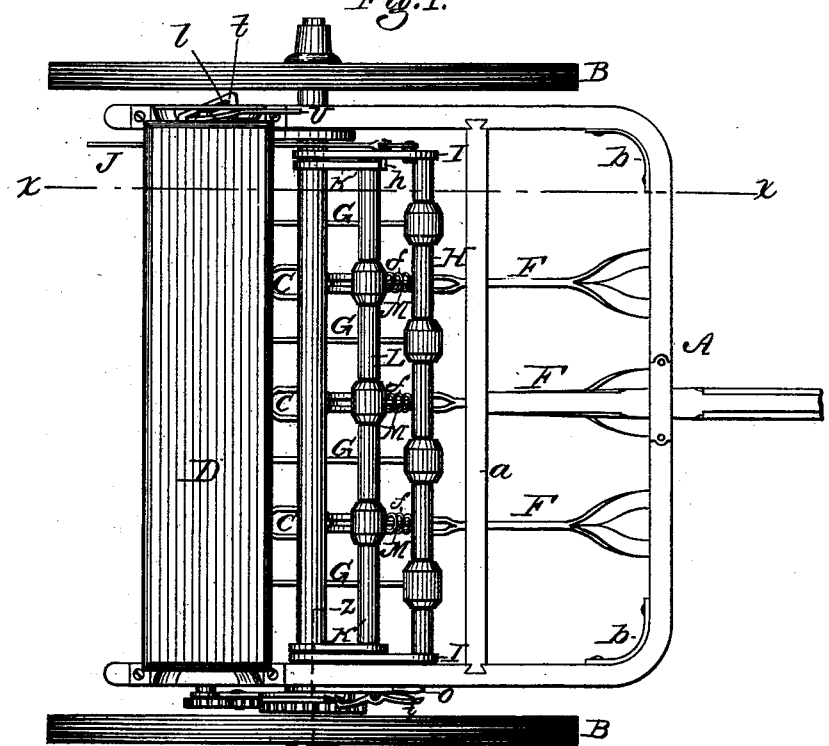
Figure 2:
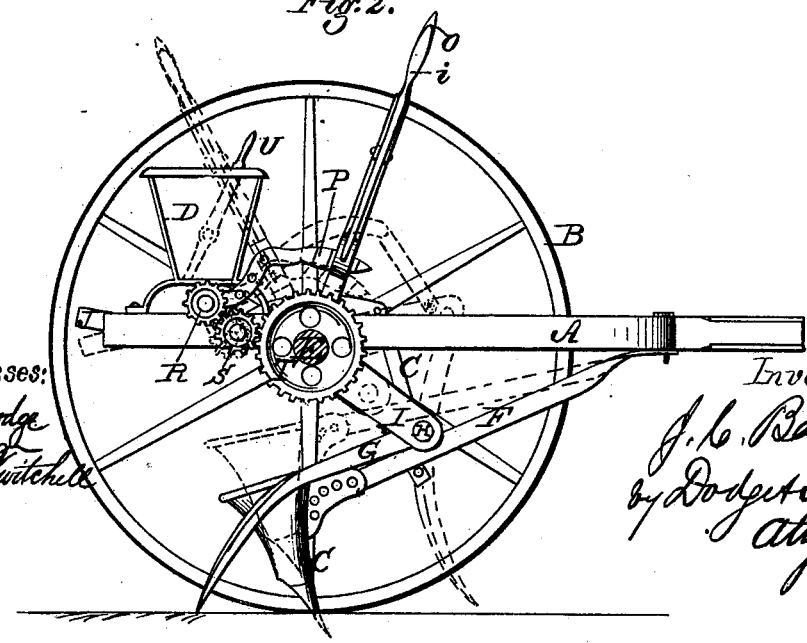

Figure 1 represents a top-plan view of the machine; Fig. 2, an end elevation of the same, with the driving-wheel removed; Fig. 3, a vertical cross-section of the machine, the clearer-arms being in an elevated position; Fig. 4, a similar view, with the points of the clearer-arms down in the ground; Fig. 5, a vertical section on the line $y$ $y$ of Fig. 4, showing the manner in which the feed-roll is mounted; Fig. 6, a vertical section on the line $z$ $z$ of Fig. 1, showing the arrangement of the lever by which the hoes are raised and lowered.

In its general construction the machine resembles those now in general use, consisting of a frame mounted on two wheels, and provided with a series of hoes, a seed-hopper, and devices for feeding the grain from the hopper down into the hoes into the furrows or drills.

In the drawing, A represents the frame; B, the two wheels; C, the hoes or drill-teeth, attached to drag-bars or beams; D, the grain-hopper, mounted on the rear end of the frame, and S an intermediate pinion for giving motion to the feeding devices secured under the hopper.

Instead of constructing the frame A as usual of straight side and cross-bars tenoned together, I make it of a single bar of wood, bent into a U shape, so as to form at once the front and the sides of the frame, as clearly represented in Fig. 1. Care is taken in bending the bar to have the portion which forms the front of the frame perfectly straight between the corner bends, which latter should be made as small and sharp as possible, in order that the entire series of drag-bars may have their forward ends attached directly to the frame in a straight row or line. The bar will be made of a strong and tough wood, and steamed, bent, and set in the manner and by the appliances familiar to workers in wood, so that there will be no danger of its losing its shape or breaking at the angles. One or more cross-bars, $a$, of wood, may be secured in the frame to give it stiffness, and to support the other parts, and when desired plates $b$ may be secured inside or outside of the corners of the frame to give it additional strength and stiffness.

By constructing the frame in a single piece I render it stronger, cheaper, and more pleasing in appearance than those of the ordinary construction.

The hoes or drill-teeth are attached as usual to the rear ends of drag-bars F, which have their forward ends attached to the front of the main frame A. The main wheels B are mounted on the ends of a transverse shaft or axle, E, which is mounted in boxes on the under side of the frame, and secured to one of the wheels, so as to turn therewith.

In order to prevent the accumulation of weeds, rubbish, &c., against the front of the hoes when they stand in a single line or rank, I provide a series of pendant clearer-arms, G, which are hung on a cross-bar, H, which has its ends secured to two arms, I, which are pivoted on the ends of the main axle, as shown in Figs. 1, 3, and 4. To one side of the frame I pivot, as shown in Figs. 1 and 3, an arm, J, having one end connected by a link, C, to one of the arms I; and on one end of the main axle I secure a cam, K, which, at each revolution of the axle, raises the arm J, which, in turn, raises the arms I and cross-bar H, so as to lift the clearer-arms G from the ground, as shown in Fig. 3.

After being raised the clearer-arms are immediately released again, so that they descend and enter the ground at their points, which are held stationary until after the hoes have advanced past them, so that, in case of there being weeds or other obstructions against the front of the hoes, they will be driven back between the latter by coming against the stationary clearer-arms. After the hoes have passed the clearers the latter are raised, permitted to swing forward, and dropped again in advance of the hoes, which pass forward, as before, between the clearer-arms. In order to render the action of the clearers more effectual their rear edges are sharpened, so that they will cut or sever the material drawn forward against them by the hoes. When the clearer-arms are not required to operate, the rear end of the arm J is depressed so as to elevate them, and fastened by inserting a pin, $d$, above it into the frame, as shown in Fig. 3. By the use of the clearer-arms operating in the manner described, I am enabled to use the hoes in a single rank, and as close together as may be required, without suffering trouble or annoyance from the accumulation of weeds or rubbish thereon. Being thus enabled to use the drills in a single rank or row, I can dispense with the usual devices for breaking ranks, and can have the frame balance at all times on the axle, so as not to throw weight or strain on the necks of the horses, and can also have all the hoes enter the ground to the same depth at all times.

For the purpose of controlling the hoes I mount on the ends of the main axle two loose arms, K', having their outer ends rigidly connected by a cross-shaft, L, on which I suspend a series of arms or links, M. One of the arms or links is extended down through each dragbar, and is provided with a pin through its lower end to lift the bar, and also provided with a spiral spring, $f$, around it, above the bar, to force the latter downward, as clearly shown in Figs. 1, 3, and 4. To one of the arms K' I secure, as shown in Fig. 6, a sleeve, N, which surrounds the main axle and extends outward beyond the main frame, and to the outer end of said sleeve I secure an upright hand-lever, O, as represented in Figs. 1, 2, and 6. By moving the lever O the cross-shaft L and its links M may be raised or lowered, so as to lift the hoes from the ground, or force them down therein, as may be desired. In order to throw up the clearer-arms when the hoes are raised from the ground, one or both of the arms I are provided with a pin or stud, $h$, as shown in Figs. 1, 3, and 4, so that when the arms K' are raised they will lift the arms I. The hand-lever O, by which the hoes are raised and lowered, is provided with a small locking lever or dog, $i$, the lower end of which engages in a notched bar, P, so as to hold the lever, and thereby the hoes, in position.

The bar P is connected with the gearing which drives the feeding mechanism, and is curved and passed through the hand-lever O in such manner that when the lever is operated to raise and lower the hoes it moves the bar P, and thereby throws the feeding mechanism in and out of gear, as described below. The feed rolls are all mounted, as usual, on a single shaft, Q, extending lengthwise under the grain-hopper D. On the end of the shaft there is secured a driving-pinion, R, which receives motion, through an intermediate pinion, S, from a gear-wheel, T, secured upon the main axle. The pinion S is mounted on the notched bar P, to which the hand-lever locks, as above described, the end of the bar being pivoted on the feed-shaft, as shown in Figs. 1 and 2, so that by raising and lowering its forward end the pinion S may be thrown into and out of gear with the wheel T. The forward end of the bar P, which passes through the hand-lever, is curved in such manner that when the lever is thrown forward to lower the hoes it causes the bar P to throw the feeding mechanism into gear, and that when the lever is drawn back to raise the hoes it throws the feeders out of gear.

The construction of the feeding devices is substantially the same as shown in the patent granted to me on the 5th day of May, 1874, there being, however, a difference in the manner of attaching the feed-rolls to the shaft, and of operating the regulating-slide. The arrangement of the roll is clearly shown in Fig. 5, in which it will be seen that the roll bears on the shaft at one end, and in the cup or case at the other end, the interior of the roll being cut away, so that it is free to move or play on the shaft, to a limited extent, so that it can adapt itself to any irregularity of the cup or eccentricity of the shaft without binding or clamping.

The roll is provided at one end with a journal, and is held from turning on the shaft by a pin, $k$, inserted through the side of the journal into the shaft, the pin being held in place by the cup or case which surrounds the journal, as shown.

The slide $t$, by which the rate of feed is regulated, extends beyond the end of the grain-hopper, as shown in Fig. 1, and is provided with an oblique groove, $l$, which receives the lower end of an upright hand-lever, V, which is pivoted to and extended above the end of the hopper, as shown in Figs. 1, 2, and 3, so that by swinging the lever forward and back the slide may be moved endwise. By extending the lever above the hopper, the operator while riding on the machine is enabled to vary and control the rate of feed, as may be required.

I am aware that a cultivator-frame has hitherto been made by bending a single bar of wood into a semicircular form; but as such frame will not admit the attachment of a straight line or row of drag-bars to its forward end, it is not adapted for use in a seeding or drilling machine, and hence it does not anticipate the frame used in my machine.

Another advantage of my square frame over the semicircular form is that, being shorter, it occupies about one-third less space, so that in shipping the machines in large quantities with the parts separated, as is the practice, a much larger number of my frames may be packed in the same space, thus reducing the cost of the freight materially, and lessening considerably the cost of the machine to the consumer located at a long distance from the factory.

I am aware that the bending of wood is old, and that wagon-bows, chair frames, ox-bows, and many other small and light articles have been made of bent wood; but I am not aware that any one has hitherto conceived the idea of or produced a frame such as that shown in the accompanying drawings adapted for use in a grain-drill.

Having described my invention, what I claim is—

1. In a seeding-machine, the combination of a bent-wood frame, A, constructed with the straight front bar, as shown and described, and a series of drag-bars, F, having their forward ends attached to said front bar.

2. In combination with the hoes of a grain-drill, a series of clearers, G, suspended on a transverse shaft, and arranged to operate in the manner described.

3. In combination with the arms I, the bar or shaft H, pendent arms G, lever-arm J, and eccentric K, constructed and operating as shown and described.

4. In combination with the arms K', connected by the shaft L, having the links M mounted thereon, and connected to the drag-bars, the hand-lever O, mounted on the main axle, and connected by the sleeve N to one of the arms K', as shown.

5. In combination with the arms K', connected with the drag-bars, and operated by the hand-lever O, the arm I, provided with the pin $h$, and having the clearer-arm shaft attached thereto, as shown, so that the movement of the lever to raise the hoes will also raise the clearer-arms.

6. In combination with the hand-lever O for raising the hoes, provided with the locking-dog $i$, the pivoted rack-bar or arm P, carrying one of the feed-operating pinions, and having one end passed through the lever, as shown, so that the hoes and feeding devices may be thrown into and out of action simultaneously by the driver with one hand while on the machine.

7. In combination with the driving-shaft Q, the feed-roll bearing loosely at one end on the shaft, and supported at the opposite end by the surrounding case or cup, as shown.

8. In combination with the shaft and the journaled feed-roll mounted loosely thereon, the loose fastening-pin $k$, secured in place by the cup or case encircling the journal, as shown and described.

9. In combination with the feed-regulating slide $t$, having its end provided with the oblique slot $l$, the upright hand-lever U, mounted on the end of the hopper, with its lower end in the slot $l$, as shown.

JOHN C. BAKER.

Witnesses:
O. S. CHENEY,
H. B. GOVE.